United States Patent
Polcwiartek et al.

(10) Patent No.: US 9,227,592 B2
(45) Date of Patent: Jan. 5, 2016

(54) AIRBAG MODULE WITH AN AIRBAG EXHIBITING A VENT OPENING CLOSED IN THE FOLDED STATE BY AN ARRESTER STRAP AND PROCEDURE OF ITS MANUFACTURE

(71) Applicant: Autoliv Development AB, Vårgårda (SE)

(72) Inventors: Marzena Polcwiartek, Nowa Sarzyna (PL); Mateusz Siwiaszcyk, Lubliniec (PL); Pawel Mikolajczyk, Wielun (PL); Sylwia Rozborska-Golec, Olawa (PL); Janusz Lagodzinski, Olawa (PL)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/333,739

(22) Filed: Jul. 17, 2014

(65) Prior Publication Data

US 2015/0028571 A1    Jan. 29, 2015

(30) Foreign Application Priority Data

Jul. 26, 2013    (DE) .......................... 10 2013 108 004

(51) Int. Cl.
| | |
|---|---|
| B60R 21/276 | (2006.01) |
| B60R 21/237 | (2006.01) |
| B60R 21/239 | (2006.01) |
| B60R 21/235 | (2006.01) |

(52) U.S. Cl.
CPC ............. *B60R 21/276* (2013.01); *B60R 21/237* (2013.01); *B60R 21/239* (2013.01); *B60R 2021/23533* (2013.01)

(58) Field of Classification Search
CPC .... B60R 21/276; B60R 21/239; B60R 21/237
See application file for complete search history.

(56) References Cited

U.S. PATENT DOCUMENTS

| | | | | |
|---|---|---|---|---|
| 6,722,695 | B2* | 4/2004 | Kobayashi et al. | 280/739 |
| 6,932,385 | B2* | 8/2005 | Hawthorn et al. | 280/739 |
| 7,261,319 | B2* | 8/2007 | DePottey et al. | 280/739 |

(Continued)

FOREIGN PATENT DOCUMENTS

| | | |
|---|---|---|
| DE | 10 2006 031 542 A1 | 1/2008 |
| DE | 10 2007 029 392 A1 | 3/2008 |

(Continued)

OTHER PUBLICATIONS

German Examination Report—Jul. 3, 2014.

*Primary Examiner* — Ruth Ilan
*Assistant Examiner* — Darlene P Condra
(74) *Attorney, Agent, or Firm* — Brinks Gilson & Lione

(57) ABSTRACT

An airbag formed of an airbag fabric (10) having a slit-shaped adaptive ventilation opening (11) which in the folded-up state of the airbag is held in at least a partially closed state by an arrester strap (20) having an end overlapping the adaptive ventilation opening (11) and fastened to the airbag fabric (10). The arrester strap (20) is guided through a safety-loop opening (31). The safety-loop opening is formed by a reinforcing blank (13) enclosing the ventilation opening (11) and the opening (31) for the arrester strap (20) is formed by an edge area of the reinforcing blank (31) not connected to the airbag fabric (10), and in that the end of the arrester strap is connected with both the airbag fabric (10) and with the reinforcing blank (13) in an area lying opposite with respect the edge section of the ventilation opening (11) forming the opening (31).

12 Claims, 4 Drawing Sheets

(56) References Cited

U.S. PATENT DOCUMENTS

| | | | |
|---|---|---|---|
| 7,497,469 B2* | 3/2009 | Fischer et al. | 280/743.2 |
| 7,722,079 B2* | 5/2010 | Lee et al. | 280/739 |
| 7,980,593 B2* | 7/2011 | Kim | 280/743.2 |
| 2003/0222446 A1 | 12/2003 | Soderquist | |
| 2007/0108750 A1* | 5/2007 | Bauer et al. | 280/740 |
| 2011/0031725 A1* | 2/2011 | Rose et al. | 280/736 |
| 2012/0153603 A1* | 6/2012 | Mallinger et al. | 280/739 |
| 2013/0069352 A1* | 3/2013 | Mendez et al. | 280/743.2 |
| 2013/0221644 A1* | 8/2013 | Beattie et al. | 280/742 |
| 2013/0229002 A1* | 9/2013 | Enders | 280/728.2 |

FOREIGN PATENT DOCUMENTS

| | | |
|---|---|---|
| EP | 1 790 538 A2 | 5/2007 |
| WO | WO 2010 121717 A1 | 10/2010 |

* cited by examiner

AIRBAG MODULE WITH AN AIRBAG EXHIBITING A VENT OPENING CLOSED IN THE FOLDED STATE BY AN ARRESTER STRAP AND PROCEDURE OF ITS MANUFACTURE

CROSS-REFERENCE TO RELATED APPLICATION

This application relates to German Patent Application No. 10 2013 108 004.9, filed Jul. 26, 2014.

FIELD OF THE INVENTION

The invention relates to an airbag module for installation in a motor vehicle having an airbag formed of an airbag fabric and with an inflation device for the folded-up airbag before its activation. The airbag exhibits at least one adaptive ventilation opening in the form of a slit made in the airbag fabric which, in the folded-up condition of the airbag, is held at least partially closed by means of an arrester strap placed on the inside of the airbag whose one end is detachably mounted on the airbag module or on a part secured to the vehicle and whose other end overlapping the adaptive ventilation opening is firmly connected with the airbag fabric. The arrester strap, beginning at the securing location positioned on the one side of the ventilation opening, is guided through an opening formed by a safety-loop lying opposite the securing location with respect to the ventilation opening and is subsequently guided to the mount. The invention is further related to a procedure to produce such an airbag module.

An airbag module having the above-mentioned generic features is described in WO 2010/121717 A1, wherein an adaptive ventilation opening formed in an especially simple manner in an airbag is disclosed. The ventilation opening is formed by a slit cut into the airbag fabric on whose both ends a hole arrangement is positioned preventing a tear of the slit on compressive stress. To close the ventilation opening, or for a signal-controlled opening, an arrester strap is provided which, beginning at its attachment on the airbag fabric, extends perpendicularly across the slit-like ventilation opening, and with its other end is detachably hooked onto the airbag module or a part secured to the vehicle, so that the arrester strap prevents a tensile stress acting on the slit when the airbag is unfolded, and thus a premature opening of the adaptive ventilation opening. If the arrester strap is intentionally released by means of an appropriately provided device, then the thereby facilitated stretching of the fabric areas initially coupled together on both sides of the slit by the arrester strap results in an opening of the slit and thus the release of the adaptive ventilation opening. The arrester strap arranged on the inside of the airbag module and overlapping the adaptive ventilation opening is guided through the safety-loop placed on the airbag fabric lying opposite the securing location of one of its ends with respect to the slit and then is guided on to the mount on the part secured on the vehicle. The disadvantage associated with the known airbag module is that the tightness of the ventilation opening cut into the airbag fabric and then held closed by the arrester strap cannot always be sufficient, and furthermore the placement of the arrester strap and the safety-loop by means of separate sewing procedures is complicated.

The underlying object of the invention is therefore to improve the airbag of the generic airbag module to the effect that the above-mentioned disadvantages are avoided, and, in particular, the manufacture of the airbag is simplified.

This object attained by advantageous embodiments and further developments of the invention in accordance with this description.

SUMMARY AND INTRODUCTORY DESCRIPTION OF THE INVENTION

In the airbag of the generic airbag module the invention provides that the safety-loop is a component part of a reinforcing blank surrounding the ventilation opening and rigidly connected to the airbag fabric, and that the safety loop opening for the arrester strap is formed by an edge section of the reinforcing blank not connected with the airbag fabric, and that the end of the arrester strap arranged between the reinforcing blank and the airbag fabric is connected with both the airbag fabric and with the reinforcing blank in an area lying opposite with respect to the ventilation opening, the edge section forming the safety loop opening.

The advantage is associated with the invention in that the ventilation opening is completely protected and sealed on its circumference by the reinforcing blank applied to the airbag fabric. Furthermore, the ventilation opening can only open as far as the surrounding reinforcing blank in a stress condition. The reinforcing blank also simultaneously forms part of the opening for the arrester strap so that here no additional component is needed for fixing the arrester strap. Thus, by means of the inventive design a uniform securing on both sides of the arrester strap with the airbag fabric is realized, on the one hand, as well as, on the other hand, a more secure attachment of the arrester strap with respect to a tearing of the arrester strap is accomplished with the reinforcing blank. Furthermore, a simple manufacture and implementation of the sewing processes are possible.

An exemplary embodiment of the invention provides that the reinforcing blank is formed as a ring enclosing the slit-shaped ventilation opening whose edges lying opposite each other and extending parallel to the ventilation opening are connected by a central area spanning the ventilation opening, wherein a slit is formed in the central area congruent with the ventilation opening, so that blank areas protruding therein on both sides of the slit result, of which the one blank area forms the reinforcing area to attach the arrester strap and the opposite blank section together with the airbag fabric forms the safety loop opening for the arrester strap. The ring-shaped reinforcing section preferably has an oval shape.

In the case of the above mentioned embodiment, it can be provided that a stop hole is formed at both ends of the slit-shaped ventilation opening in the airbag fabric and an opening aligning with the associated stop hole of the airbag fabric is formed in the interior of the ring forming the reinforcing blank on both sides of the central middle section, so that the function of the ventilation opening is not impeded upon its release by the arrester strap and a sufficiently large outflow cross-section is provided by the reinforcing blank.

In order to improve the resilience of the attachment of the arrester strap on the airbag fabric and the reinforcing blank, two-dimensional expansion corresponding to the reinforcing area formed on the reinforcing blank is formed on the strip-shaped arrester strap formed on the end connected with the airbag fabric.

An alternative embodiment can provide that the reinforcing blank is formed as a ring enclosing the slit-shaped ventilation opening, and the end of the strip-shaped arrester strap connected with the airbag fabric has a two-dimensional expansion having an outer attachment area and a guide area adjacent thereon narrowing in a funnel-like manner toward the remainder of the arrester strap, wherein the attachment area is connected with the reinforcing blank on the one side of the slit-shaped ventilation opening, and the guide area on the side of the slit-shaped ventilation opening lying opposite the attachment area is enclosed by a seam determining the opening and connecting the reinforcing blank to the airbag fabric. Here, too, the reinforcing blank can have an oval shape.

With respect to a simplification of the mounting procedure requiring an opposite positional association of the end of the arrester strap and the reinforcing blank, it can be provided that for the opposite positional fixation of the end of the arrester strap and the reinforcing blank on the arrester strap, on the one hand, and, on the other hand, on the reinforcing area of the reinforcing blank, openings allocated, or corresponding to, each other are arranged, into which, for example, positioning aids engage, so that the parts are held firmly in the desired location during assembly.

In so far as stop holes formed in the airbag fabric are provided, an exemplary embodiment of the invention provides that these stop holes are formed as standard ventilation openings exhibiting an open cross-section. These standard ventilation openings are constantly open and act as an adaptive ventilation opening together with the slit-shaped ventilation opening first held closed by the arrester strap.

In so far as the invention also includes a procedure to produce an airbag associated with the airbag module, a first procedure can provide that in a first step the associated end of the arrester strap is sewn to the reinforcing area of the reinforcing blank and in a second step the reinforcing blank is so emplaced on the airbag fabric that the arrester strap end sewn on the reinforcing blank comes to rest between the reinforcing blank and the airbag fabric and the section of the arrester strap leading on to the mount overlaps the ventilation opening. Subsequently the reinforcing blank in the applied position is sewn circumferentially to the airbag fabric, wherein the opening for the arrester strap section is recessed during the circumferential sewing of the reinforcing blank with the airbag fabric. It can also be provided that the reinforcing area with the end of the arrester strap sewn thereon is sewn together to the airbag fabric by means of a continuous seam.

An alternative procedure can provide that in a first step the arrester strap is placed in a position on the airbag fabric overlapping the ventilation opening formed in the airbag fabric and then the reinforcing blank is placed in its position on the arrester strap and airbag fabric enclosing the ventilation opening and is sewn to the airbag fabric in its edge areas positioned outside the overlap of the arrester strap, and that in a second step the arrester strap moving with respect to the airbag fabric and the reinforcing blank is brought into its attachment position and subsequently sewn to the airbag fabric on its associated end.

It is hereby useful, if the seam connecting the airbag fabric with the reinforcing blank made in the first step along the seam forming the opening for the arrester strap forms a funnel-shaped receiving area for the guide area of the expansion arranged on the end of the arrester strap, so that in the second step when the arrester strap is placed in its attachment position, the end of the arrester strap with the guide area of its expansion lying between the airbag fabric and the reinforcing blank is captured by the course of the seam and fixed in position, and as a result, the opening for the arrester strap is sealed. The advantage of an improved sealing of the ventilation opening at least in the through area for the arrester strap between the airbag fabric and the reinforcing blank is associated with the design achieved with such a procedure.

BRIEF DESCRIPTION OF THE DRAWINGS

Inventive embodiments of the present invention are shown in the drawings, which are then described below. Shown are.

FURTHER DESCRIPTION OF THE INVENTION

Figure 1A:
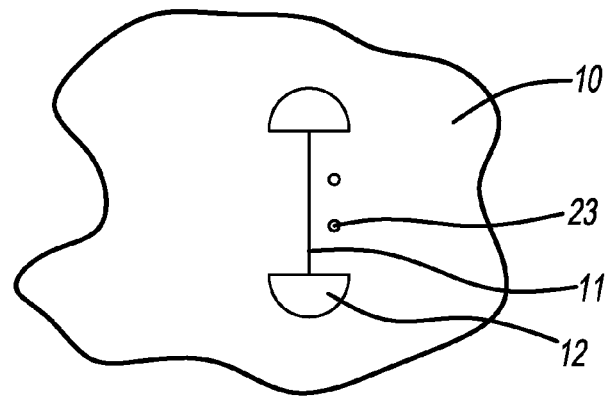
FIG. 1a is a top view of a partial layout consisting of an airbag fabric for an airbag with a slit-shaped ventilation opening placed thereon.

In so far as FIG. 1a schematically shows a partial blank of an airbag fabric 10 provided for the production of an airbag, a slit-shaped ventilation opening 11 is formed in the airbag fabric 10 on whose both opposite ends a stop hole 12 is positioned in the form of a semi-circular opening which lies with its straight edge against the end of the slit-shaped ventilation opening 11.

Figure 1B:
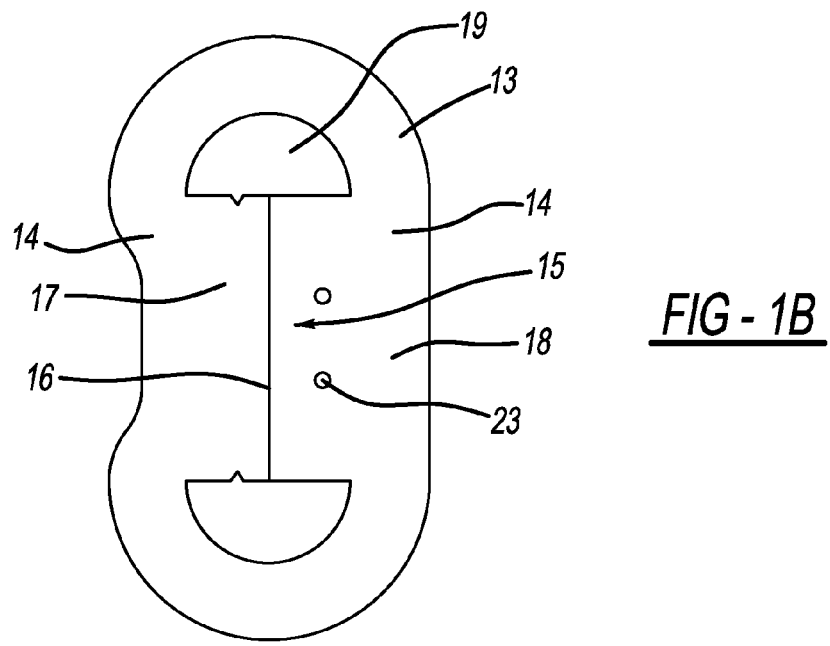
FIG. 1b is a top view of an associated reinforcing blank.

FIG. 1b shows a reinforcement blank 13, which has an oval shape such that the reinforcement blank 13 externally encloses the slit-shaped ventilation opening 11 of the airbag fabric 10 including both its stop holes 12. In the process, the edge areas 14 of the reinforcing blank 13 opposite each other and extending parallel to the ventilation opening 11 are connected to each other by a central area 15 spanning the ventilation opening 11, in which central area a slit 16 is formed aligning with the slit-shaped ventilation opening 11 in the airbag fabric 10. In so far as there are blank areas protruding on both sides of the slit 16 in the direction of the slit 16, the one blank area serves as a reinforcement section 17 for the attachment of an arrester strap still to be described and the opposite reinforcement section 18 together with the airbag fabric 10 to form an opening for the arrester strap in accordance with the following description. Formed in the interior of the ring forming the reinforcement blank 13 is an opening 19 on both sides of the central area 15 aligning with the associated stop holes 12 in the airbag fabric 10.

Figure 1C:
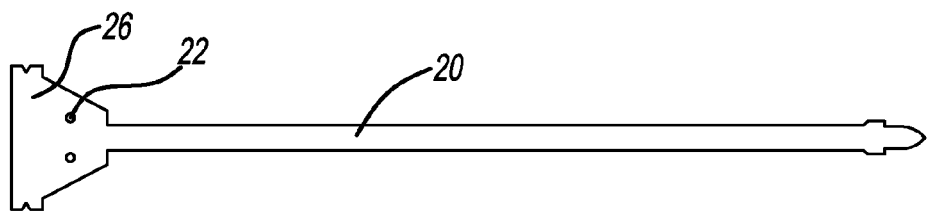
FIG. 1c is a top view of an associated arrester strap.

The associated arrester strap 20 shown in FIG. 1c on its (left) end has an expansion 26 provided for attaching to the airbag fabric 10 and to the reinforcement blank 13. Openings 22 are formed in the arrester strap 20 in the expansion 26 with which corresponding openings 23 are associated both in the airbag fabric 10 as well as in the reinforcement section 18, so that the arrester strap 20 can be oriented with regard to the airbag fabric 10 as well as with respect to the reinforcement blank 13 with the help, for example, of positioning aids engaging into the openings 22 and 23.

Figure 2A:
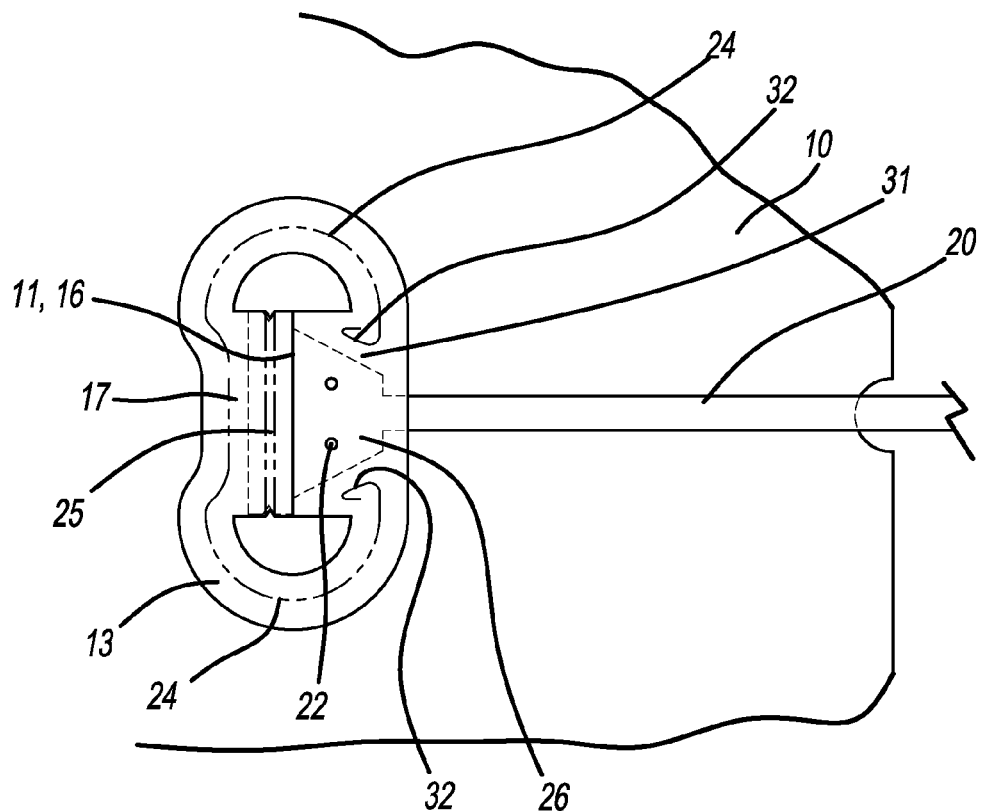
FIG. 2a is a top view corresponding to FIG. 1a of an airbag fabric blank according to FIG. 1a after assembly of the reinforcing blank and arrester strap.
Figure 2B:
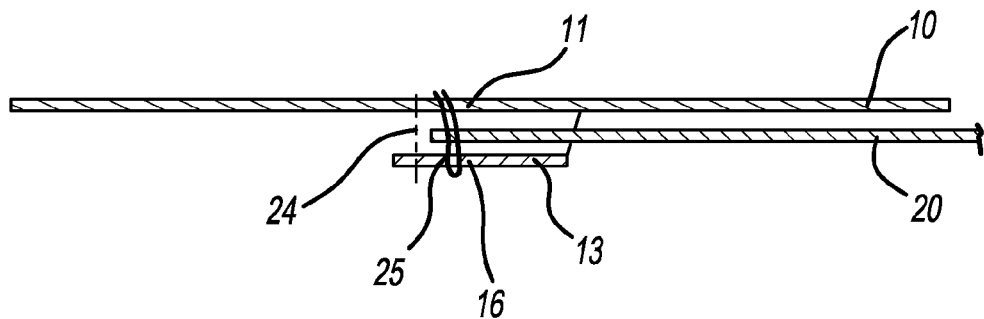
FIG. 2b is a sectional side of the object of FIG. 2a, FIG. 3a is a top view of another exemplary embodiment of the partial blank consisting of an airbag fabric for an airbag with the slit-shaped ventilation opening placed thereon.

As can be seen in FIGS. 2a and 2b, the assembly of the arrester strap 20 on the airbag fabric is completed as follows. Initially, in a first step the end of the arrester strap 20 forming the expansion 26 is emplaced on the reinforcing blank 13 such that the outermost end of the expansion 26 comes to rest on the reinforcement section 17 of the reinforcement blank 13 and thereby overlaps the slit 16 formed in the reinforcing blank 13. The mutual fixation of the reinforcing blank 13 and the arrester strap 20 is ensured in that the openings 22 of the expansion 26 of the arrester strap 20 align with the corresponding openings 23 formed in the reinforcement section 18 of the reinforcing blank 13, wherein positioning aids can engage in the openings 22 and 23. In this position, the outer end of the expansion 26 of the arrester strap 20 is sewn to the reinforcement section 17 of the reinforcing blank 13 by means of a double seam line 25. In a second step, the reinforcement blank 13 with the expansion 26 of the arrester strap 20 sewn thereon is turned 180 degrees and then applied on the airbag fabric 10 such that the arrester strap 20 coming to rest between the airbag fabric 10 and the reinforcing blank 13 and overlaps the slit-shaped ventilation opening 11. The related positioning in turn occurs in that the openings 22 made in the expansion 26 in the arrester strap 20 align with the openings 23 formed in the airbag fabric 10 and a positioning device engaging in the openings 22 and 23 may be provided. In this position, the reinforcing blank 13 is now connected with the airbag fabric 10 by means of a surrounding seam line 24, wherein this seam line 24 completes the sewing of the expansion 26 of the arrester strap 20 with the reinforcing section 17 of the reinforcing blank 13 and terminates in seam ends 32 oriented inward on both sides of the safety loop opening 31 formed for the passing the arrester strap 20 between the airbag fabric 10 and the reinforcing blank 13. The airbag fabric 20 cooperates with the reinforcing blank 13 to form a safety loop for the arrester strap 20 passing through the safety loop opening 31.

Figure 3A:
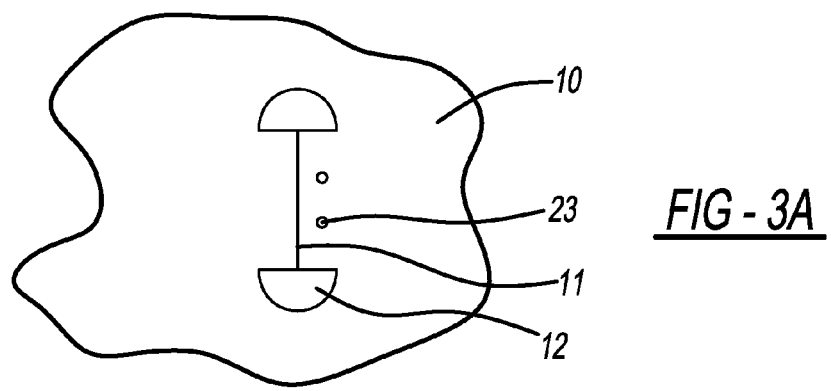
FIG. 3b is a top view of an associated reinforcing blank.
FIG. 3c is a top view of an associated arrester strap.
Figure 4A:
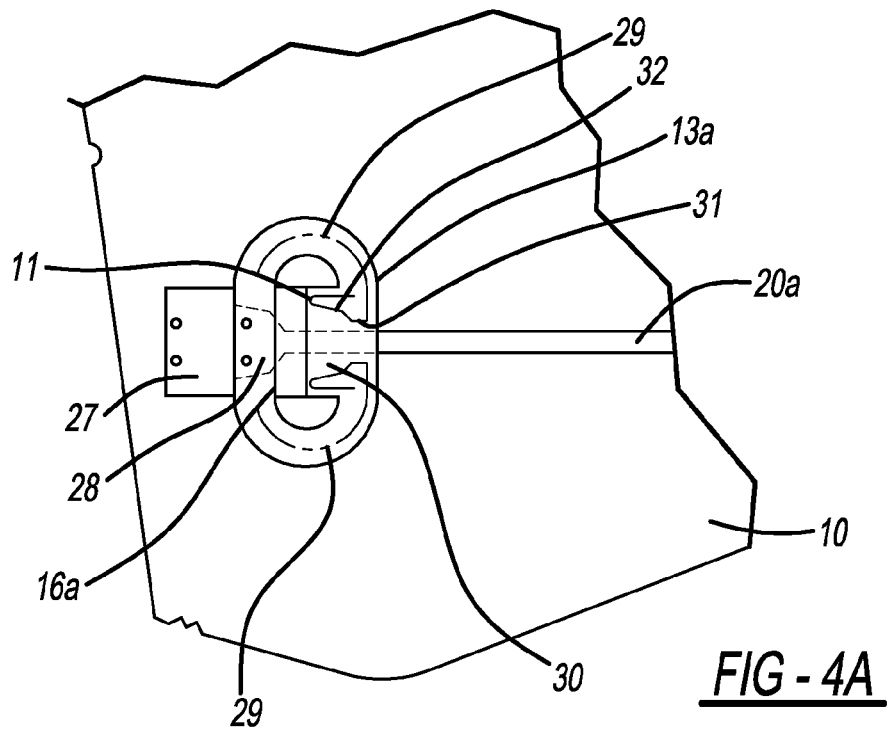
FIG. 4a shows the airbag fabric blank according to FIG. 3a in an intermediate assembly step with an applied arrester strap and a partially sewn reinforcing section.
Figure 4B:
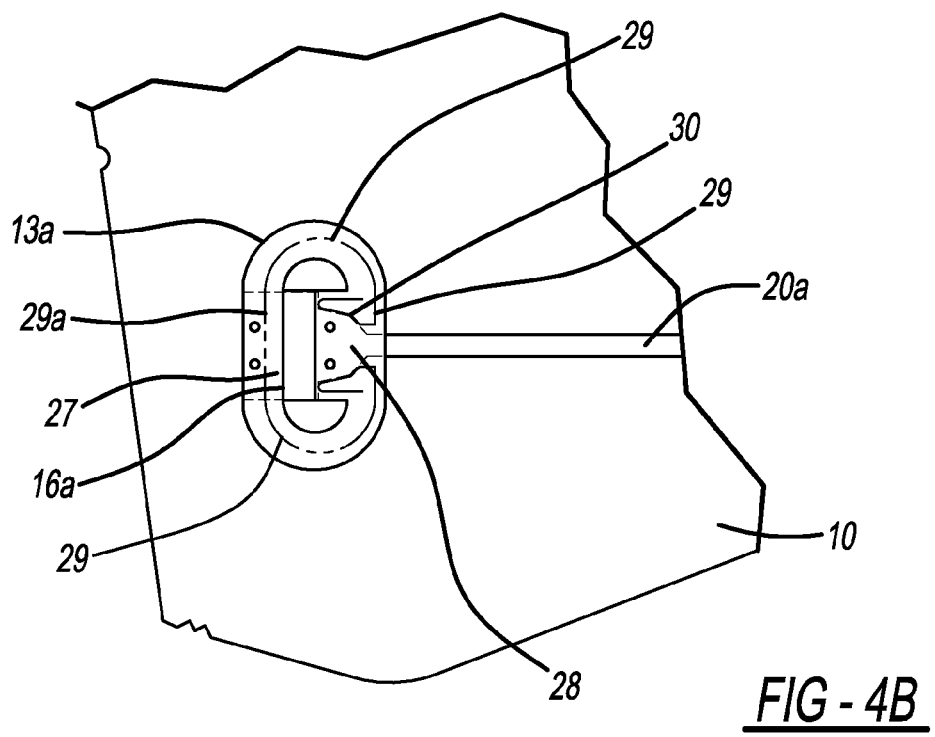
FIG. 4b shows the object of FIG. 4a after the completed assembly of the reinforcing blank and arrester strap on the airbag fabric.

In so far as another embodiment of the invention is shown in FIGS. 3a and 4b the partial blank of an airbag fabric 10 shown in FIG. 3a with a ventilation opening 11 arranged therein as well as the acceptance opening 23 corresponds to the embodiment described in FIG. 1a.

Figure 3B:
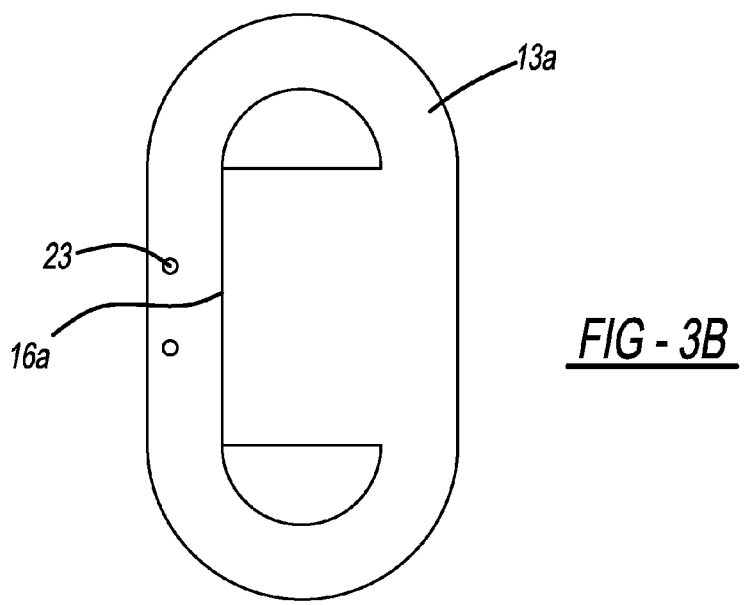

The reinforcing blank 13a visible in FIG. 3b again has the shape of an oval ring which encloses the slit-shaped ventilation opening 11 in the airbag fabric 10 and should enclose it in the applied state. Reinforcing blank 13a forms slit 16a. In general, however, the reinforcing blank can have any shape, for example a triangular shape.

Figure 3C:
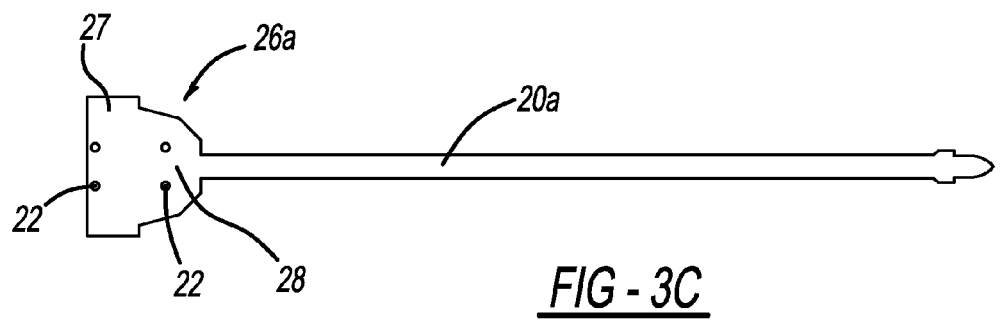

The arrester strap 20a shown in FIG. 3c differs from the arrester strap described in FIG. 1c in that its expansion 26a on the end side has a different shape. In the exemplary embodiment shown in FIG. 3c, this expansion 26a consists of a rectangular attachment area 27 applied on the outer end of the arrester strap 20 and a guide area 28 adjoining thereon and narrowing funnel-like along the course of the arrester strap. An opening 22 is formed both in the attachment area 27 as well as in the guide area 28.

As is apparent from FIGS. 4a and 4b, the assembly is implemented in a first step shown in FIG. 4a by the arrester strap 20a being applied to the airbag fabric 10 in a location overlapping the ventilation opening 11 formed in the airbag fabric 10, and then the reinforcing blank 13a is applied in a position on the arrester strap 20a and airbag fabric 10 which encloses the ventilation opening 11. In this initial position, the attachment area 27 of the expansion 26a at least still lies outside the reinforcement blank 13. In this positioning, the airbag fabric 10, the arrester strap 20a and the reinforcing blank 13a to each other, the reinforcing blank 13a is first sewn to the airbag fabric 10 in its edge area located outside the overlap of the arrester strap 20a by means of a seam 29, wherein the seam is guided inward on both sides of the course of the arrester strap 20a in the edge area 14 provided to form the opening 31 such that a funnel-shaped acceptance area 30 with a shape corresponding to the guide area 28 is formed on the end of the arrester strap.

In the second procedural step resulting from a comparison of FIGS. 4a and 4b, the arrester strap 20a is now drawn into a position in which the guide area 28 of the expansion 26a of the end of the arrester strap 20a is caught and consequently secured in the funnel-shaped acceptance area 30 so that the rectangular attachment area 27 comes to rest on the opposite side of the ventilation opening 11 below the associated edge area 14 of the reinforcing blank 13. In this position, the gap left during the application of the seam 29 in the first procedural step is closed by the application of another seam 29a by means of which the reinforcing blank 13, the attachment area 27 of the expansion 26a of the arrester strap 20a, and the airbag fabric 10 are now connected to each other.

While the above description constitutes the preferred embodiment of the present invention, it will be appreciated that the invention is susceptible to modification, variation and change without departing from the proper scope and fair meaning of the accompanying claims.

The invention claimed is:

1. An airbag formed of an airbag fabric forming part of an airbag module for installation into a motor vehicle of the type having an inflation device for inflating the airbag in a folded-up state before its activation, the airbag comprising at least one adaptive ventilation opening in the form of a slit made in the airbag fabric which, in the folded-up state, is held in at least a partially closed state by means of an arrester strap placed on the inside of the airbag having a first end and an opposite second end, the second end overlapping the adaptive ventilation opening and firmly connected with the airbag fabric at a securing location, wherein the arrester strap, beginning at the securing location is arranged on one side of the ventilation opening and is guided through a safety loop forming a safety loop opening lying at an opposite side of the ventilation opening, the safety loop being formed in part by the airbag fabric and a reinforcing blank enclosing the ventilation opening and firmly connected with the airbag fabric, the safety loop opening for the arrester strap is formed in part by an edge area of the reinforcing blank not connected to the airbag fabric, and the second end of the arrester strap is arranged between the reinforcing blank and the airbag fabric and is connected with both the airbag fabric and with the reinforcing blank in an area lying opposite with respect to the edge area of the ventilation opening forming part of the safety loop opening;

wherein the reinforcing blank is formed as a ring enclosing the ventilation opening having first and second reinforcing sections lying opposite each other and extending parallel to the ventilation opening are connected by a central area spanning the ventilation opening, wherein a reinforcing blank slit is formed in the central area congruent with the ventilation opening, so that the first and the second reinforcing sections expand on both sides of the reinforcing blank slit, as a result of which the first reinforcing section forms a reinforcing area to attach the arrester strap and the opposite second reinforcing section together with the airbag fabric forms the safety loop opening for the arrester strap, wherein the second end of the arrester strap connected with the airbag fabric has a two-dimensional expansion formed corresponding to one of the reinforcing sections formed by the reinforcing blank.

2. The airbag according to claim 1, further comprising in that that a first stop hole is formed at both ends of the ventilation opening in the airbag fabric and a second stop hole aligning with the associated first stop hole of the airbag fabric is formed in the interior of the ring forming the reinforcing blank on both sides of a central area of the reinforcing blank.

3. The airbag according to claim 2 wherein the first stop holes formed in the airbag fabric are formed as ventilation openings having an open cross-section.

4. The airbag according to claim 1, wherein, the arrester strap, the airbag fabric, and the reinforcing blank each form positioning openings arranged associated to each other for a mutual positional fixation of the second end of the arrester strap, the airbag fabric, and the reinforcing blank.

5. A process to produce an airbag formed according to claim 1, the process comprising the steps of:
   in a first step, sewing the second end of the arrester strap to the first reinforcing section of the reinforcing blank, and
   in a second step, placing the reinforcing blank on the airbag fabric such that the second end of the arrester strap sewn on the reinforcing blank comes to rest between the reinforcing blank and the airbag fabric in an attachment position and the arrester strap overlaps the ventilation opening, and
   subsequently, sewing the reinforcing blank in an applied position circumferentially to the airbag fabric, wherein the safety loop opening is recessed for the arrester strap during the circumferential sewing of the reinforcing blank with the airbag fabric.

6. The process according to claim 5, wherein the seam connecting the airbag fabric with the reinforcing blank made in the first step forms a funnel-shaped receiving area along the seam forming the opening for the arrester strap for a guide area arranged on the end of the arrester strap, so that in the second step when the arrester strap is placed in the attachment position, the second end of the arrester strap with the guide area of its expansion lying between the airbag fabric and the reinforcing blank is captured by the course of the seam and fixed in position, and as a result the safety loop opening for the arrester strap is sealed.

7. An airbag formed of an airbag fabric forming part of an airbag module for installation into a motor vehicle of the type having an inflation device for inflating the airbag in a folded-up state before its activation, the airbag comprising at least one adaptive ventilation opening in the form of a slit made in the airbag fabric which, in the folded-up state, is held in at least a partially closed state by means of an arrester strap placed on the inside of the airbag having a first end and an opposite second end, the second end overlapping the adaptive ventilation opening and firmly connected with the airbag fabric at a securing location, wherein the arrester strap, beginning at the securing location is arranged on one side of the ventilation opening and is guided through a safety loop forming a safety loop opening lying at an opposite side of the ventilation opening, the safety loop being formed in part by the airbag fabric and a reinforcing blank enclosing the ventilation opening and firmly connected with the airbag fabric, the safety loop opening for the arrester strap is formed in part by an edge area of the reinforcing blank not connected to the airbag fabric, and the second end of the arrester strap is arranged between the reinforcing blank and the airbag fabric and is connected with both the airbag fabric and with the reinforcing blank in an area lying opposite with respect to the edge area of the ventilation opening forming part of the safety loop opening;
   wherein the reinforcing blank is formed as a ring enclosing the ventilation opening and the second end of the arrester strap connected with the airbag fabric has a two-dimensional expansion having an outer attachment area and with a guide area adjacent thereon narrowing funnel-like along the arrester strap, wherein the outer attachment area is connected with the reinforcing blank on the one side of the ventilation opening, and the guide area on the side of the ventilation opening lying at the opposite side of the ventilation opening is enclosed by a seam defining an edge of the safety loop opening and connecting the reinforcing blank to the airbag fabric.

8. A process to produce an airbag according to claim 7, the process comprising in a first step, placing the arrester strap in a position on the airbag fabric overlapping the ventilation opening formed in the airbag fabric and then placing the reinforcing blank in position on the arrester strap and the airbag fabric enclosing the ventilation opening and sewing the reinforcing black to the airbag fabric in edge areas positioned outside the overlap of the arrester strap, and, in a second step, moving the arrester strap with respect to the airbag fabric and the reinforcing blank and bringing the arrester strap into an attachment position and is subsequently sewing the arrester strap to the airbag fabric.

9. The airbag according to claim 7, wherein a first stop hole is formed at both ends of the ventilation opening in the airbag fabric and a second stop hole aligning with the associated first stop hole of the airbag fabric is formed in the interior of the ring forming the reinforcing blank on both sides of a central area of the reinforcing blank.

10. The airbag according to claim 9 wherein the first stop holes formed in the airbag fabric are formed as ventilation openings having an open cross-section.

11. The airbag according to claim 7, wherein, the arrester strap, the airbag fabric, and the reinforcing blank each form positioning openings arranged associated to each other for a mutual positional fixation of the second end of the arrester strap, the airbag fabric, and the reinforcing blank.

12. The process to produce an airbag formed of an airbag fabric forming part of an airbag module for installation into a motor vehicle of the type having an inflation device for inflating the airbag in a folded-up state before its activation, the airbag comprising at least one adaptive ventilation opening in the form of a slit made in the airbag fabric which, in the folded-up state, is held in at least a partially dosed state by means of an arrester strap placed on the inside of the airbag having a first end and an opposite second end, the second end overlapping the adaptive ventilation opening and firmly connected with the airbag fabric at a securing location, wherein the arrester strap, beginning at the securing location is arranged on one side of the ventilation opening and is guided through a safety loop forming at an opposite side of the ventilation opening, the safety loop being formed in part by the airbag fabric and a reinforcing blank enclosing the ventilation opening and firmly connected with the airbag fabric, the safety loop opening for the arrester strap is formed in part by an edge area of the reinforcing blank not connected to the airbag fabric, and the second end of the arrester strap is arranged between the reinforcing blank and the airbag fabric and is connected with both the airbag fabric and with the reinforcing blank in an area lying opposite with respect to the edge area of the ventilation opening forming part of the safety loop opening;
   the process comprising the steps of:
   in a first step, sewing the second end of the arrester strap to the first reinforcing section of the reinforcing blank, and
   in a second step, placing the reinforcing blank on the airbag fabric such that the second end of the arrester strap sewn on the reinforcing blank comes to rest between the reinforcing blank and the airbag fabric in an attachment position and the arrester strap overlaps the ventilation opening, and
   subsequently, sewing the reinforcing blank in an applied position circumferentially to the airbag fabric, wherein the safety loop opening is recessed for the arrester strap during the circumferential sewing of the reinforcing blank with the airbag fabric;

wherein the seam connecting the airbag fabric with the reinforcing blank made in the first step forms a funnel-shaped receiving area along the seam forming the opening for the arrester strap for a guide area arranged on the end of the arrester strap; so that in the second step when the arrester strap is placed in the attachment position, the second end of the arrester strap with the guide area of its expansion lying between the airbag fabric and the reinforcing blank is captured by the course of the seam and fixed in position, and as a result the safety loop opening for the arrester strap is sealed.

* * * * *

UNITED STATES PATENT AND TRADEMARK OFFICE
CERTIFICATE OF CORRECTION

| | |
|---|---|
| PATENT NO. | : 9,227,592 B2 |
| APPLICATION NO. | : 14/333739 |
| DATED | : January 5, 2016 |
| INVENTOR(S) | : Marzena Polewiartek et al. |

It is certified that error appears in the above-identified patent and that said Letters Patent is hereby corrected as shown below:

<u>In the Claims</u>

In Column 8, claim 12, line 37, "dosed" should be --closed-- and in line 44, after "forming", insert --a safety loop opening lying--.

Signed and Sealed this
Nineteenth Day of April, 2016

Michelle K. Lee
*Director of the United States Patent and Trademark Office*